US011514048B2

(12) United States Patent
Hofstetter et al.

(10) Patent No.: US 11,514,048 B2
(45) Date of Patent: *Nov. 29, 2022

(54) COMPUTING DOMAIN CARDINALITY ESTIMATES FOR OPTIMIZING DATABASE QUERY EXECUTION

(71) Applicant: Tableau Software, Inc., Seattle, WA (US)

(72) Inventors: Sebastian Hofstetter, Munich (DE); Moritz Kaufmann, Munich (DE); Thomas Neumann, Munich (DE); Viktor Leis, Munich (DE); Alfons Kemper, Munich (DE); Tobias Muehlbauer, Munich (DE); Jan Finis, Munich (DE); Manuel Then, Munich (DE)

(73) Assignee: TABLEAU SOFTWARE, INC., Seattle, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/088,439

(22) Filed: Nov. 3, 2020

(65) Prior Publication Data

US 2021/0049176 A1 Feb. 18, 2021

Related U.S. Application Data

(63) Continuation of application No. 16/236,183, filed on Dec. 28, 2018, now Pat. No. 10,824,625.

(51) Int. Cl.
*G06F 16/2453* (2019.01)
*G06N 3/08* (2006.01)
(52) U.S. Cl.
CPC ........ *G06F 16/24545* (2019.01); *G06N 3/08* (2013.01)

(58) Field of Classification Search
CPC .................. G06F 16/24545; G06N 3/08
(Continued)

(56) References Cited

U.S. PATENT DOCUMENTS 6,738,755 B1 * 5/2004 Freytag ............. G06F 16/24545
707/999.005
2005/0223019 A1 10/2005 Das et al.
(Continued)

OTHER PUBLICATIONS

Hofstetter, Preinterview First Office Action, U.S. Appl. No. 16/236,183, dated Jun. 24, 2020, 4 pgs.
(Continued)

*Primary Examiner* — Evan Aspinwall
(74) *Attorney, Agent, or Firm* — Morgan, Lewis & Bockius LLP

(57) ABSTRACT

A method implements optimization of database queries by computing domain cardinality estimates. A client sends a database query to a server. The method parses the query to identify data columns. For each of the data columns, the method computes a lower bound and an upper bound of distinct data values using a pre-computed table size. The method also computes a patch factor by applying a pre-computed function to a ratio between a number of distinct data values that appear exactly once in a data sample and a number of distinct data values in the sample. Based on the patch factor, the lower bound, and the upper bound, the method computes an estimate of distinct values for each of the data columns. The method subsequently generates an execution plan for the query according to the computed estimates, executes the execution plan, and returns a result set to the client.

20 Claims, 11 Drawing Sheets

(58) Field of Classification Search
USPC .......................................................... 707/718
See application file for complete search history.

(56) References Cited

U.S. PATENT DOCUMENTS

| | | | |
|---|---|---|---|
| 2015/0254330 A1* | 9/2015 | Chan ................... | G06F 11/3006 |
| | | | 707/613 |
| 2020/0125568 A1 | 4/2020 | Idicula et al. | |

OTHER PUBLICATIONS

Hofstetter, Notice of Allowance, U.S. Appl. No. 16/236,183, dated Jul. 30, 2020, 9 pgs.

* cited by examiner

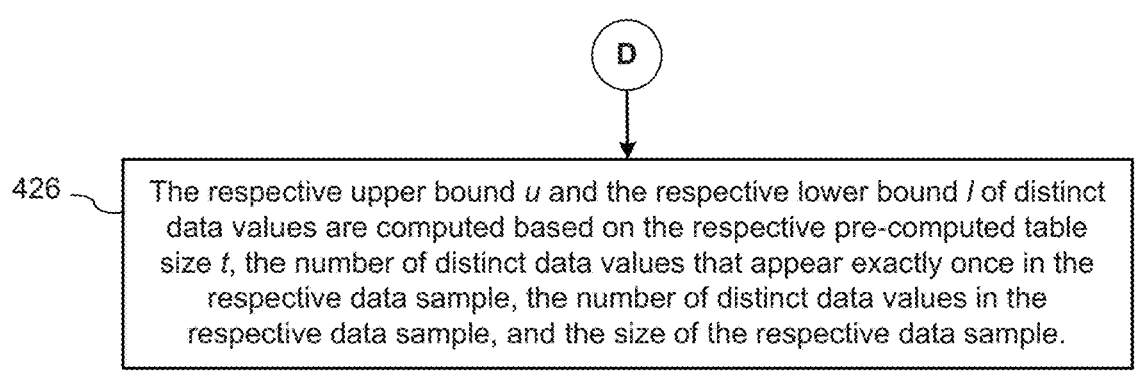

426 — The respective upper bound *u* and the respective lower bound *l* of distinct data values are computed based on the respective pre-computed table size *t*, the number of distinct data values that appear exactly once in the respective data sample, the number of distinct data values in the respective data sample, and the size of the respective data sample.

Figure 4E

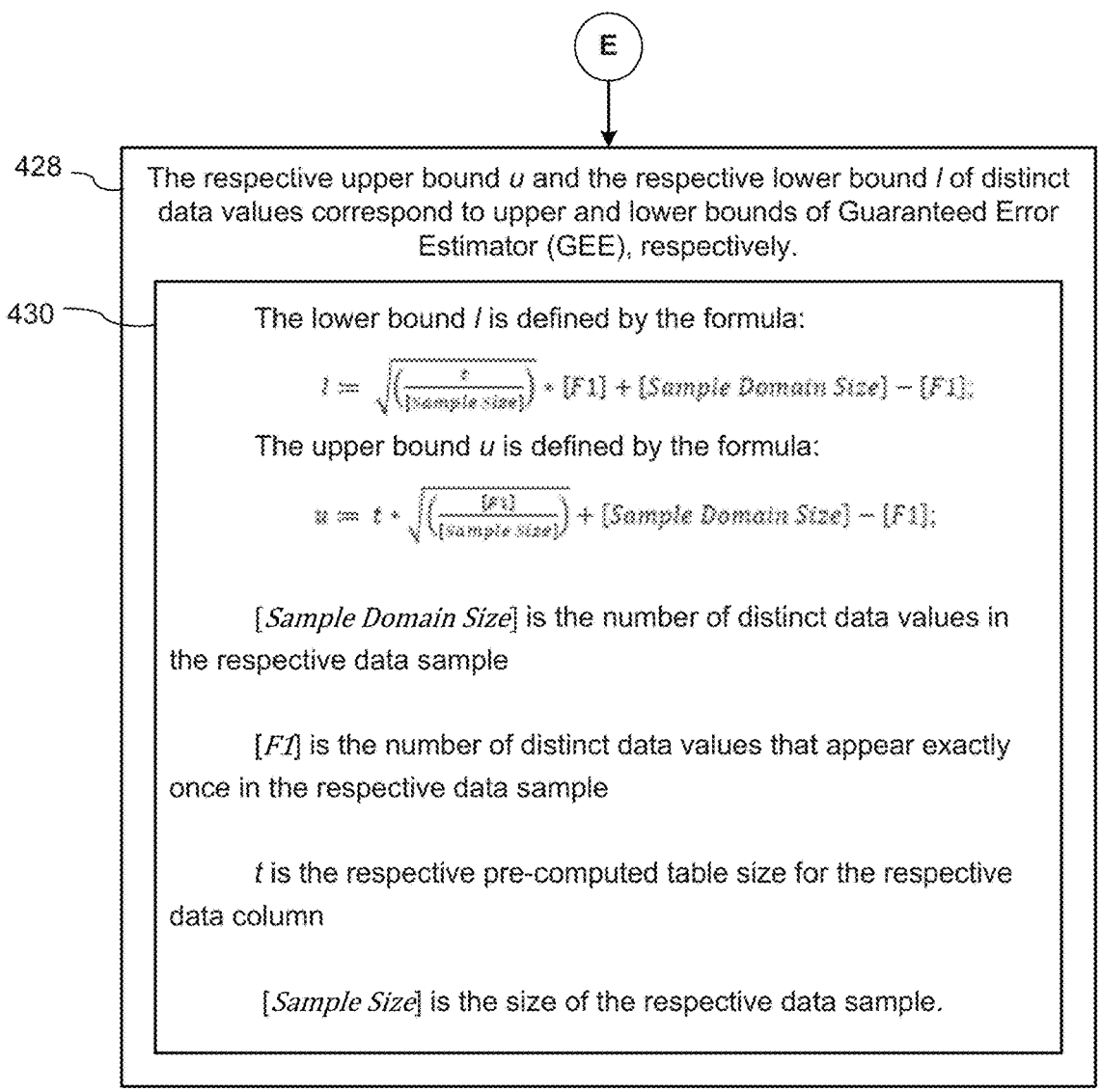

428 — The respective upper bound *u* and the respective lower bound *l* of distinct data values correspond to upper and lower bounds of Guaranteed Error Estimator (GEE), respectively.

430 — The lower bound *l* is defined by the formula:

$$l = \sqrt{\left(\frac{t}{[Sample\ Size]}\right) \cdot [F1] + [Sample\ Domain\ Size] - [F1]};$$

The upper bound *u* is defined by the formula:

$$u = t + \sqrt{\left(\frac{[F1]}{[Sample\ Size]}\right) + [Sample\ Domain\ Size] - [F1]};$$

*[Sample Domain Size]* is the number of distinct data values in the respective data sample

*[F1]* is the number of distinct data values that appear exactly once in the respective data sample

*t* is the respective pre-computed table size for the respective data column

*[Sample Size]* is the size of the respective data sample.

Figure 4F

442 — Compute the respective estimate $e$ of distinct data values for the respective data column comprises calculating $e$ based on the following formula:

$$e := p * u + (1 - p) * l$$

where:
- $p$ is respective patch factor for the respective data column;
- $l$ is respective lower bound for the respective data column; and
- $u$ is respective upper bound for the respective data column.

Figure 4I

COMPUTING DOMAIN CARDINALITY ESTIMATES FOR OPTIMIZING DATABASE QUERY EXECUTION

CROSS-REFERENCE TO RELATED APPLICATIONS

The current application is a continuation of U.S. patent application Ser. No. 16/236,183, filed Dec. 28, 2018, entitled "Computing Domain Cardinality Estimates for Optimizing Database Query Execution," which is incorporated by reference in its entirety.

TECHNICAL FIELD

The disclosed implementations relate generally to database systems, and more specifically to system features that improve query execution performance.

BACKGROUND

A database engine receives queries, and retrieves data from one or more database tables to provide the data requested by the query. A database query is expressed in a specific query language, such as SQL. In general, a database query specifies the desired data without specifying a detailed execution plan about how to retrieve the data. It is up to the database engine to parse each query, build an execution plan, and execute the plan to retrieve the requested results. This gives the database engine substantial flexibility. However, different execution plans for the same query can have enormously different execution times to retrieve the results. For example, one execution plan may retrieve the results in less than a second, whereas a second plan may take minutes to retrieve exactly the same results.

To address this issue, database engines typically include one or more optimization layers to improve execution performance. Database engines approximate an arbitrarily large database in a constant amount of space, and employ cost-based query optimizations based on cardinality estimation. A cardinality estimate predicts how many rows a query is likely to return. For example, to obtain an efficient query plan with a good join order, a query optimizer enumerates a subset of valid join orders using dynamic programming. A cost model then selects the cheapest alternative from semantically equivalent plans based on cardinality estimates. Cardinality estimates can thus considerably influence the query execution performance of a database system. Unfortunately, existing cardinality estimation algorithms produce large errors for real-word datasets, which lead to slow queries and unpredictable performance.

SUMMARY

Accordingly, there is a need for better and more accurate cardinality estimation. The database engine described here uses estimates from a training or learning phase in an offline mode, using a large variety of table sizes and samples, to improve the accuracy of cardinality estimates during real-time processing of database queries. Moreover, because full-scale calculations are performed offline, the computation time is not part of the query processing time.

When a query is received by a database engine, the query is parsed and translated into an abstract syntax tree. Semantic analysis turns the syntax tree into an operator tree. Building the operator tree combines the syntax tree with schema information, resolves table and column names, and resolves internal references within the query. During logical optimization, the database engine employs an array of optimization techniques, including join reordering, which leverage the more accurate cardinality estimates. Thus, the database engine described herein is able to better optimize complex database queries, and thereby improves query execution performance.

A method is provided for optimizing database query execution by computing domain cardinality estimates. In accordance with some implementations, the method is performed at a computer having one or more processors and memory storing one or more programs. The one or more programs are configured for execution by the one or more processors. The process receives a database query from a client device. The process parses the query to identify a plurality of data columns specified in the query. For each of the plurality of data columns, the process computes a respective lower bound l and a respective upper bound u of distinct data values for the respective database column using a respective pre-computed table size t for the respective data column. The process also computes a respective patch factor p for the respective data column by applying a pre-computed function f to a respective ratio r between a number of distinct data values that appear exactly once in a respective data sample for the respective data column and a number of distinct data values in the respective data sample. Based on the respective patch factor p, the respective lower bound l, and the respective upper bound u, the process computes a respective estimate e of distinct values for the respective data column. The process subsequently generates an execution plan for the query according to the computed estimates, and executes the execution plan to retrieve a result set from the database corresponding to the query, and returns the result set to the client.

In some implementations, the process calculates the pre-computed function f by fitting a curve to plotted data points of table domain sizes versus ratio values for a respective pre-determined set of tables and a respective pre-determined set of data samples corresponding to the respective data column. In some implementations, the process computes the pre-computed function f in an offline mode, before receiving the database query from the client. In some implementations, the process computes the pre-computed function f in the offline mode, using a machine learning technique by training a neural network using various table sizes corresponding to the respective data column.

In some implementations, the process computes the respective pre-computed table size t according to a size of the respective data sample and a number of rows in the respective data sample that have been deleted. In some implementations, the process reads the respective pre-computed table size t from stored metadata for the respective table corresponding to the respective data column.

In some implementations, the process pre-selects the respective data sample for the respective data column in an offline mode, before receiving the database query from the client. In some implementations, the process updates the respective data sample when a respective table corresponding to the respective data column changes by at least 10% (e.g., when the total number of rows added or deleted exceeds 10% of the number of rows).

In some implementations, the process computes the respective upper bound u and the respective lower bound l of distinct data values based on the respective pre-computed table size t, the number of distinct data values that appear exactly once in the respective data sample, the number of distinct data values in the respective data sample, and the size of the respective data sample.

In some implementations, the respective upper bound u and the respective lower bound l of distinct data values correspond to upper and lower bounds computed using Guaranteed Error Estimator (GEE).

In some implementations, the lower bound l is defined by the formula:

$$l := \sqrt{\left(\frac{t}{[\text{Sample Size}]}\right)} * [F1] + [\text{Sample Domain Size}] - [F1].$$

And, the upper bound u is defined by the formula:

$$u := t * \sqrt{\left(\frac{[F1]}{[\text{Sample Size}]}\right)} + [\text{Sample Domain Size}] - [F1].$$

In the equations above, [Sample Domain Size] is the number of distinct data values in the respective data sample, [F1] is the number of distinct data values that appear exactly once in the respective data sample, t is the respective pre-computed table size for the respective data column, and [Sample Size] is the size of the respective data sample.

In some implementations, the process computes the respective estimate e of distinct data values for the respective data column comprises calculating e based on the formula e:=p*u+(1−p)*l, where p is the respective patch factor for the respective data column, l is respective lower bound for the respective data column, and u is respective upper bound for the respective data column.

In accordance with some implementations, a system for retrieving data from a database includes a display, one or more processors, memory, and one or more programs stored in the memory. The programs are configured for execution by the one or more processors. The programs include instructions for performing any of the methods described herein.

In accordance with some implementations, a non-transitory computer-readable storage medium stores one or more programs configured for execution by a computer system having a display, one or more processors and memory. The one or more programs include instructions for performing any of the methods described herein.

Thus methods, systems, and graphical user interfaces are provided that implement query optimization based on computing domain cardinality estimates.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIGS. 4A-4I provide a flowchart of a process for optimizing database queries by computing domain cardinality estimates according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
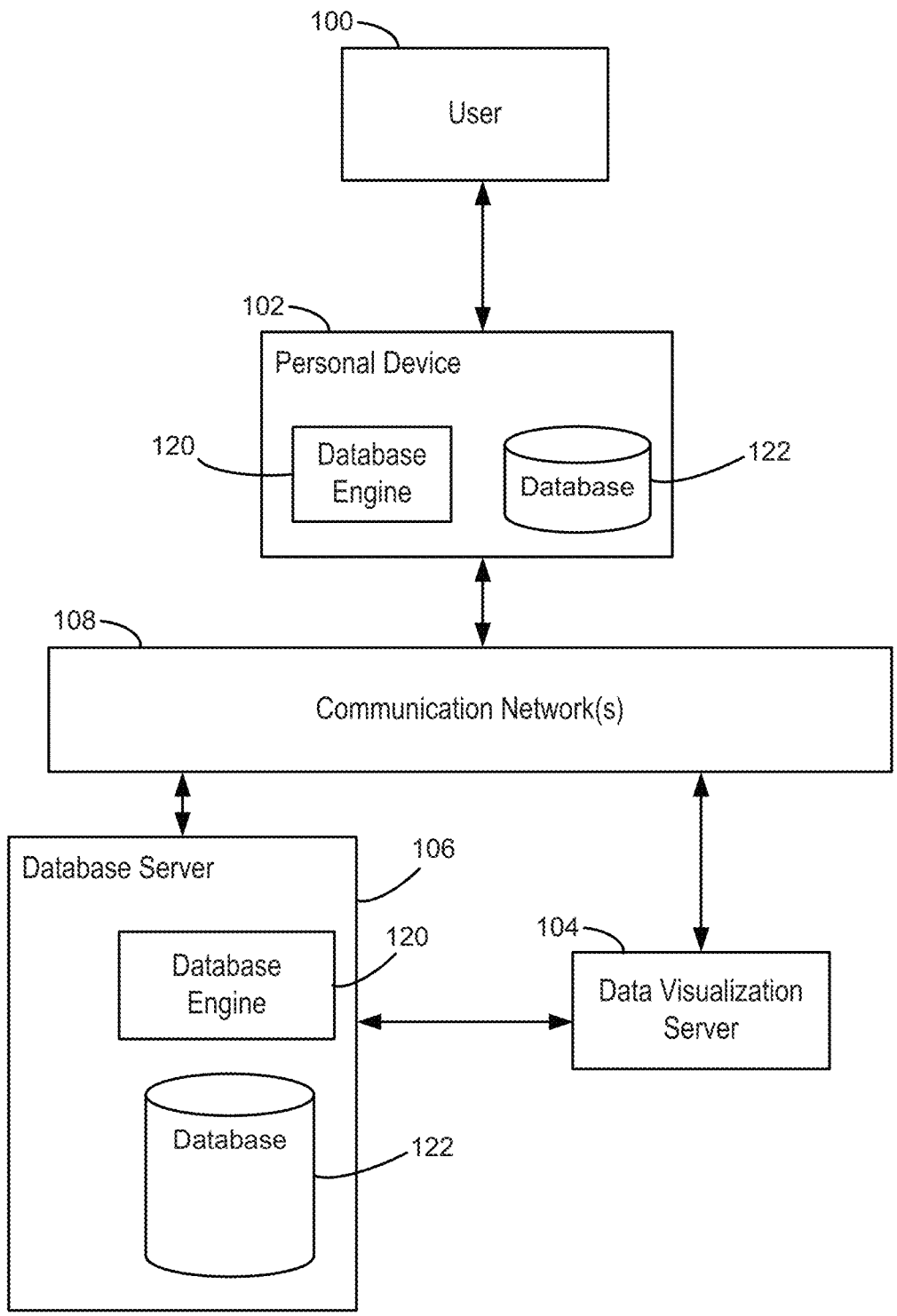
FIG. 1 illustrates the context for a database system in accordance with some implementations.

FIG. 1 illustrates a context in which some implementations operate. A user 100 interacts with a personal device 102, such as a desktop computer, a laptop computer, a tablet computer, or a mobile computing device. A personal device 102 is an example of a computing device 200. The term "computing device" also includes server computers, which may be significantly more powerful than a personal device used by a single user, and are generally accessed by a user only indirectly. An example computing device 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). In some implementations, the personal device includes a data visualization application 222, which the user 100 uses to create data visualizations from the desktop data sources 224 and/or the relational databases 122. In this way, some implementations enable a user to visualize data that is stored locally on the personal device 102.

In some cases, the personal device 102 connects over one or more communications networks 108 to one or more external database servers 106 and/or a data visualization server 104. The communication networks 108 may include local area networks and/or wide area networks, such as the Internet. In some implementations, the data visualization server 104 provides a data visualization web application that runs within a web browser 220 on the personal device 102. In some implementations, data visualization functionality is provided by both a local application 222 and certain functions provided by the data visualization server 104. For example, the data visualization server 104 may be used for resource intensive operations. In some implementations, the one or more database servers 106 include a database engine 120, which provides access to one or more databases 122 that are stored at the database server 106. As illustrated in FIG. 1, a database engine 120 and corresponding databases 122 may reside on either a local personal device 102 or on a database server 106. In some implementations (not illustrated here), the data visualization server 104 includes a database engine 120 and one or more databases 122.

Figure 2A:
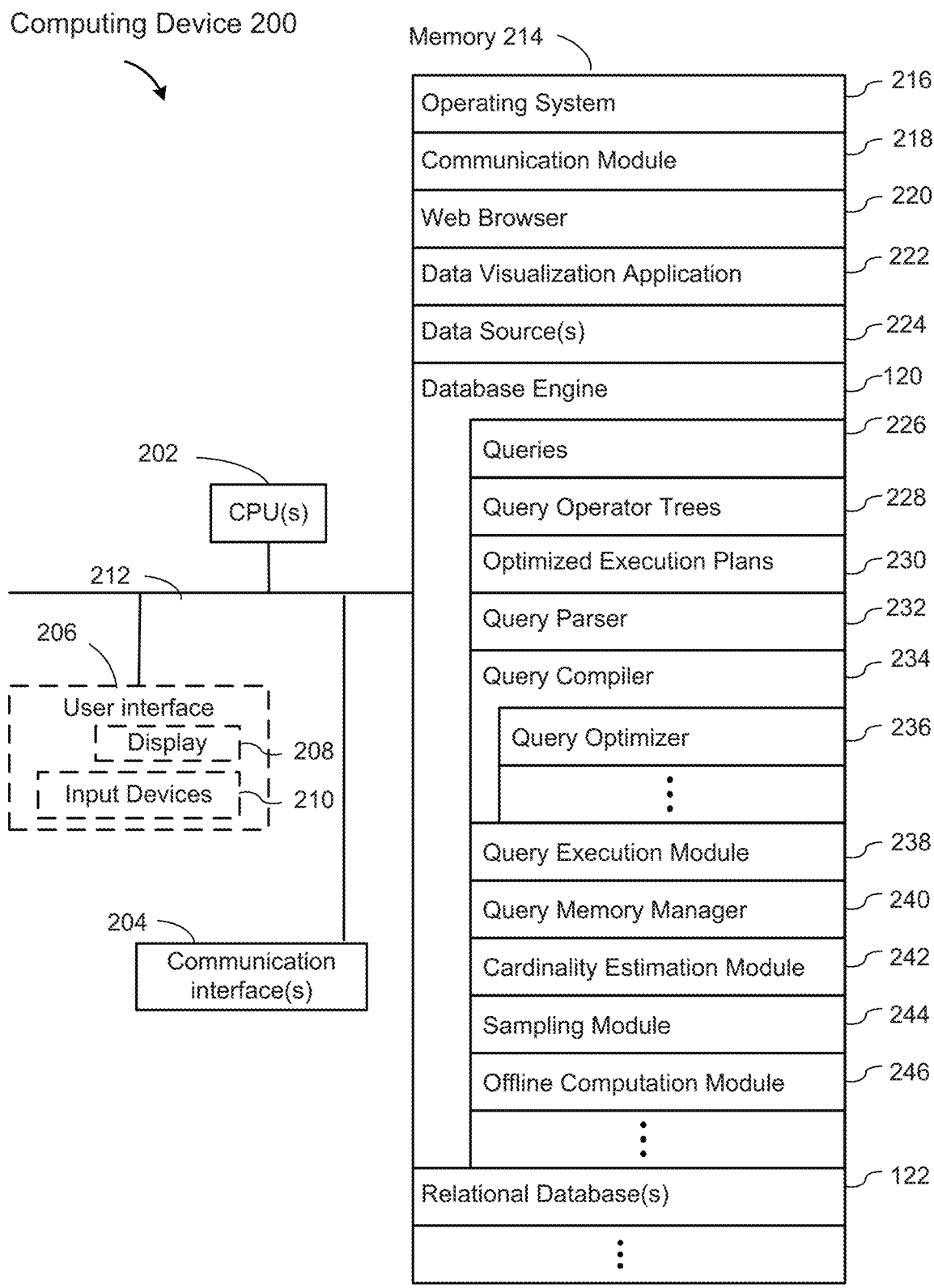
FIG. 2A is a block diagram of a computing device according to some implementations.

FIG. 2A is a block diagram illustrating a computing device 200 in accordance with some implementations. As used herein, the term "computing device" includes both personal devices 102 and servers, such as a database server 106 or a data visualization server 104. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components.

The communication buses 212 may include circuitry that interconnects and controls communications between system components. A computing device 200 may include a user interface 206 comprising a display device 208 and one or more input devices or mechanisms 210. In some implementations, the input device/mechanism 210 includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as data source 224 (e.g., a CSV file or flat file), a relational database stored locally 122, or a data source or relational database stored on another device (such as database server 106). The data visualization application then generates and displays the retrieved information in one or more data visualizations;
- one or more data sources 224, which have data that may be used and displayed by the data visualization application 222. Data sources 224 can be formatted in many different ways, such as spreadsheets, XML files, flat files, CSV files, text files, JSON files, or desktop database files. Typically, the data sources 224 are used by other applications as well (e.g., a spreadsheet application);
- a database engine 120, which receives database queries 226 (e.g., a query from a data visualization application) and returns corresponding data. The database engine 120 typically includes a plurality of executable modules;
- the database engine 120 invokes a query parser 232 which parses each received query 226 (e.g., SQL database query) to form a query operator tree 228. An operator tree is sometimes referred to as an algebra tree. In some implementations, the query parser 232 is contained within the query compiler 234. In some implementations, the query parser 232 also identifies one or more data columns specified in the database query 226;
- the database engine 120 includes a query compiler 234, which translates each query operator tree 228 into executable code. For brevity, the query compiler 234 is also referred to as the compiler. In some implementations, the compiler 234 includes an optimizer 236, which modifies a query operator tree 228 to produce an optimized execution plan 230. The optimizer 236 is generally capable of identifying multiple types of optimization based on the structure of the query operator tree and the data requested. For example, some implementations identify when to hoist subexpressions, such as a conditional subexpression, outside of a conditional expression. In some implementations, the compiler 234 and/or the optimizer 236 store data structures, such as hash maps and lists of the dependencies between query operators in the memory 214, to support or guide the optimization passes;
- the database engine 120 includes a query execution module 238, which executes a query execution plan (e.g., an optimized execution plan 230) generated by the query compiler 234;
- the database engine 120 includes a query memory manager 240, which tracks memory utilization by each of the processes, and dynamically allocates memory as needed;
- the database engine 120 includes a cardinality estimation module 242, which computes domain cardinality estimates for one or more data columns identified by the query parser 232;
- the database engine 120 includes a sampling module 244, which builds samples used by the cardinality estimation module 242; and
- the database engine 120 also includes an offline computation module 246, which computes various data structures used by the cardinality estimation module 242 in an offline mode (e.g., before the database engine 120 receives database queries).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Standard relational database query engines rely on relational algebra trees (e.g., an operator tree 228) for evaluating logically optimized plans. A typical algebra tree 228 has the nice property that its leaves correspond to base relations and each node in the tree 228 can be evaluated based solely on nodes of its subtree. To evaluate a node in the tree, a typical "iterator engine" works by pulling intermediate results from the subtrees corresponding to children of the node.

Some database engines choose access paths as part of the logical optimization. The existence of an index on a joined column can enable the usage of index-nested loop joins and thereby influences the optimality of different join orders. Because of this, access paths are typically chosen as part of join reordering. Next, the database engine chooses a physical implementation for each of the algebraic operators in the operator tree. In some implementations, during this phase, the database engine also chooses the appropriate access path and indices to retrieve the requested data as fast as possible. The optimized operator tree is compiled to native machine code, according to some implementations. This compiled code is then loaded and linked with the database engine at runtime and executed. Thus, in some implementations, the database engine functions essentially as an optimizing JIT compiler for database queries.

In some implementations, in order to enable efficient code generation, implementations use a produce-consume execution model. In this execution model, the code for all operators is fused together, enabling the system to push one tuple at a time through the whole operator tree up to the next pipeline breaker.

In some implementations, the database engine uses "Morsel-driven parallelism." In this parallelization model, work is dynamically balanced between worker threads. Tuples are handed out to the worker threads in so-called morsels, which are chunks of a few thousand tuples. Worker threads take thread-locality into account when picking up morsels for processing.

In some implementations, the database engine's optimizer and query engine are decoupled from the database storage layer. This enables the database engine to work on a large set of different storage formats.

Figure 2B:
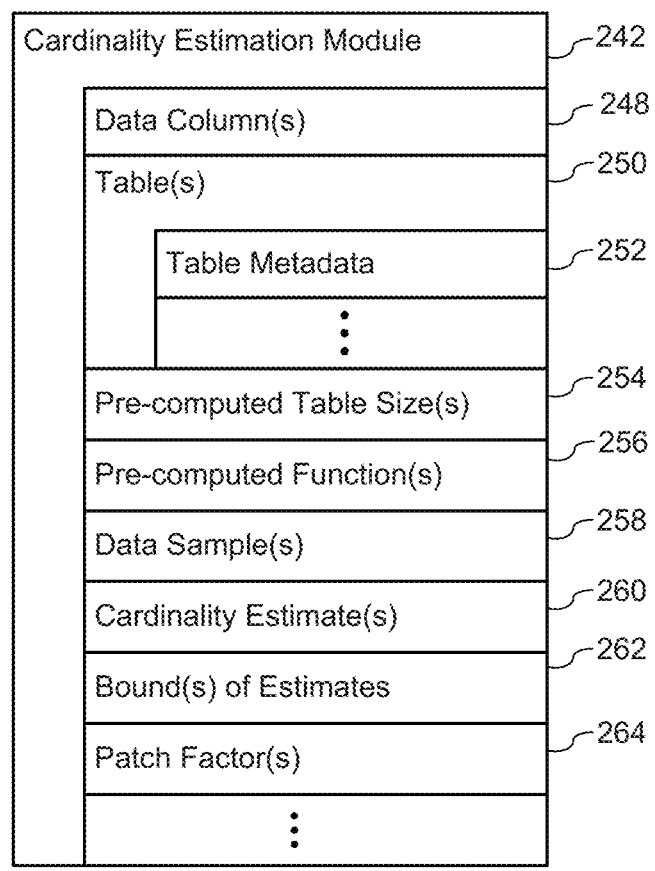
FIG. 2B is a block diagram of a cardinality estimation module of the computing device shown in FIG. 2A according to some implementations.

FIG. 2B is a block diagram of the cardinality estimation module 242 shown in FIG. 2A according to some implementations. In some implementations, the memory 214, or the computer readable storage medium of the memory 214, stores the following modules, and/or data structures of the cardinality estimation module 242, or a subset thereof:

one or more data column identifiers 248;
one or more table identifiers 250 corresponding to the data column identifiers 248. In some implementations, the memory 214 also stores metadata 252 corresponding to the tables 250 as identified by the offline computation module 246;
one or more pre-computed table sizes 254, as computed by the offline computation module 246;
one or more pre-computed functions 256, as computed by the offline computation module 246. A pre-computed function is used to compute patch factors as described below with respect to FIGS. 3A-3C;
one or more data samples 258, built by the sampling module 244;
one or more cardinality estimates 260, for the data columns 248, computed by the cardinality estimation module 242;
one or more bounds 262 (e.g., lower bounds or upper bounds of cardinality estimates) of estimates computed by the cardinality estimation module 242; and
one or more patch factors 264 computed by the cardinality estimation module 242.

Figure 3A:
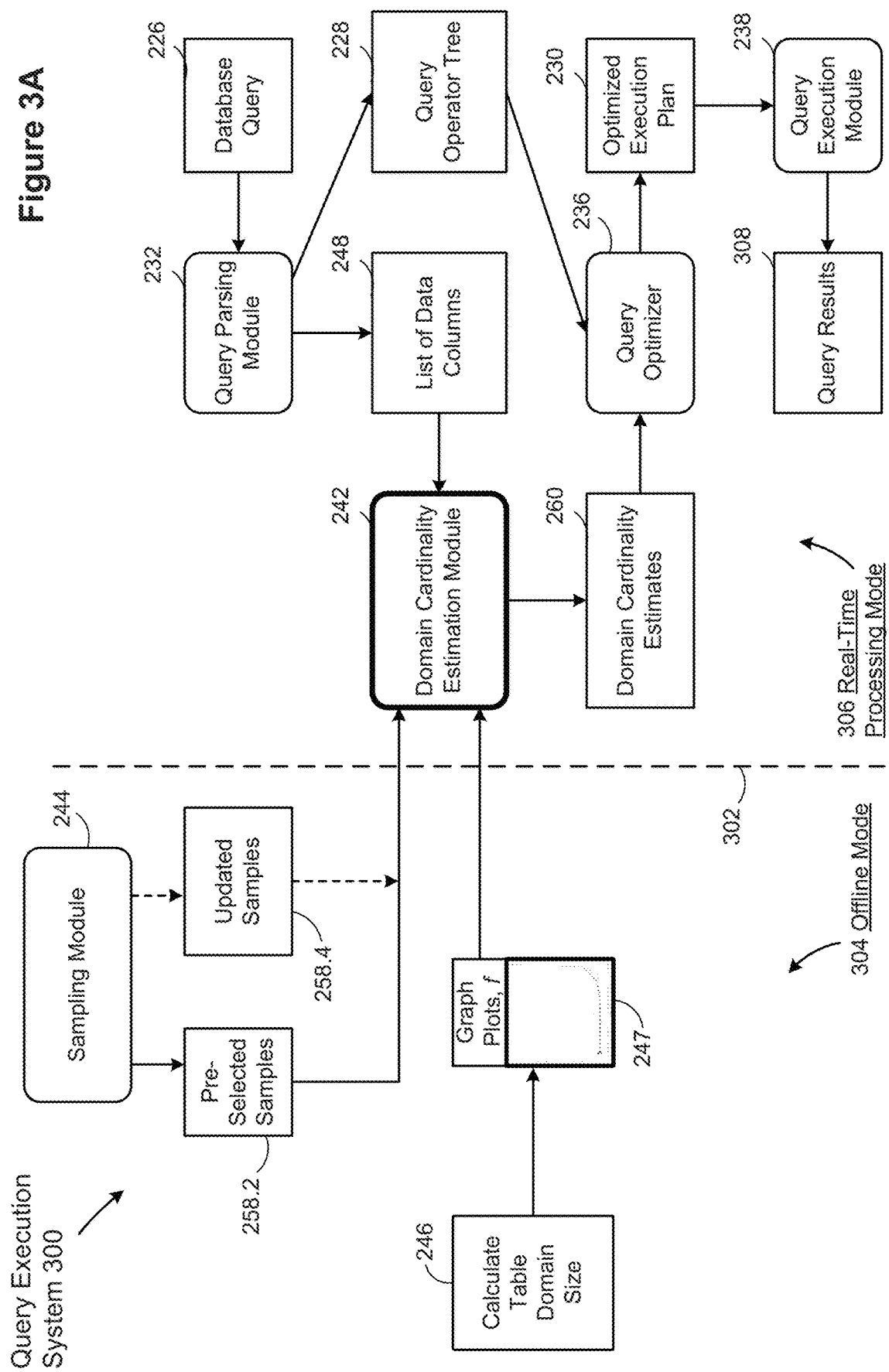
FIGS. 3A and 3C are block diagrams of query execution systems implemented by a computer system in accordance with some implementations.
Figure 3B:
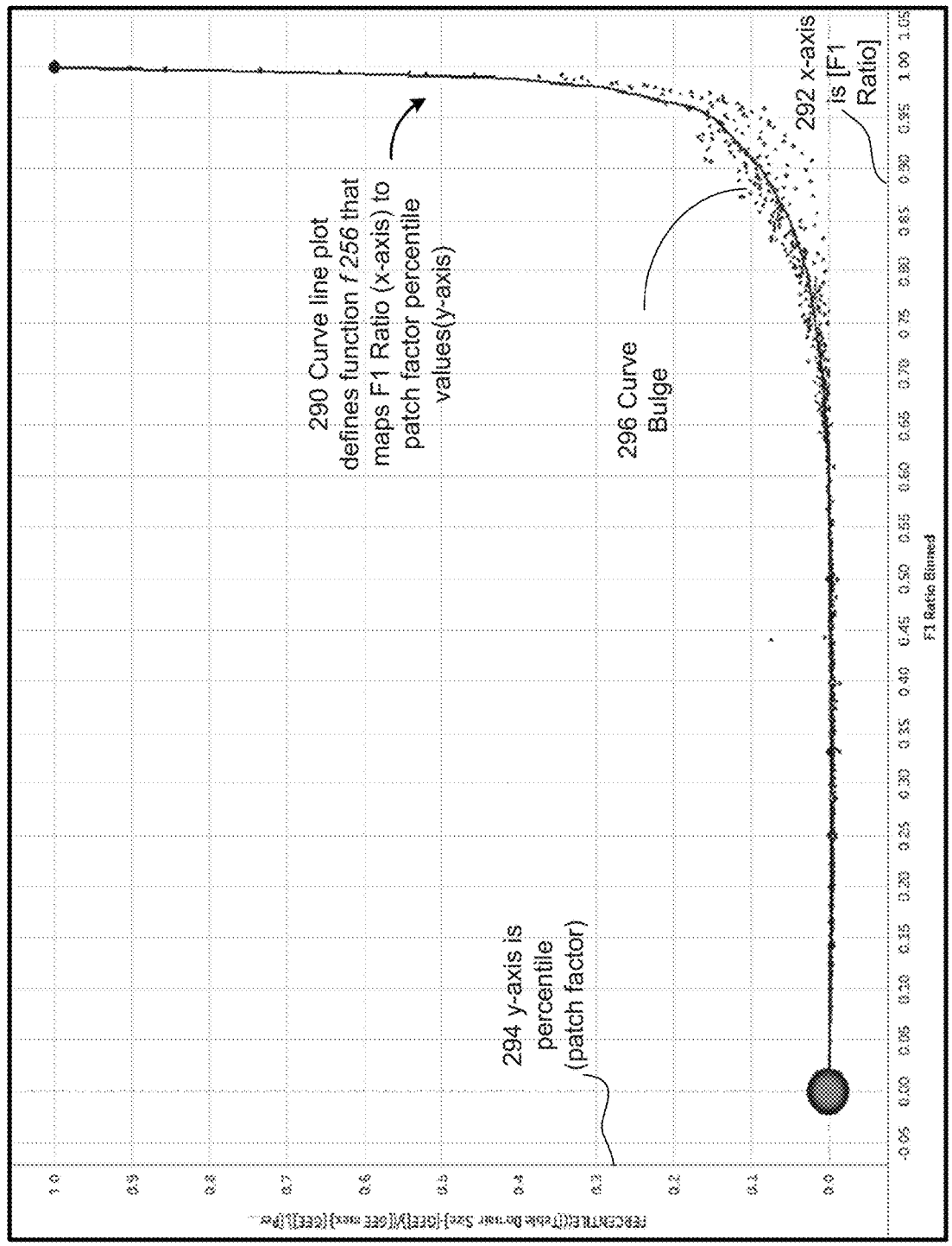
FIG. 3B illustrates an example graph plot of patch factor percentile values versus ratio values for a set of tables and data samples according to some implementations.
Figure 3C:
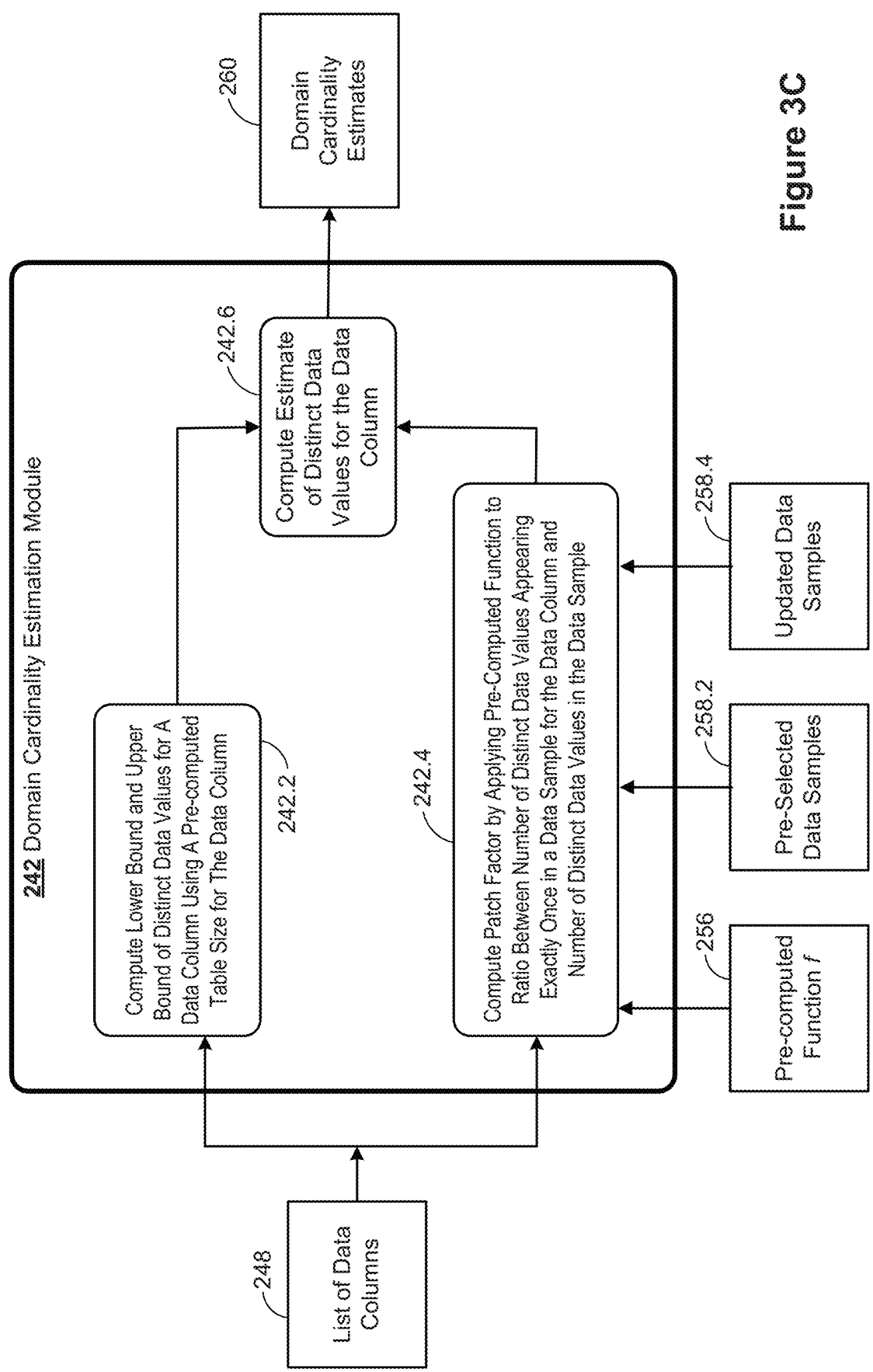

FIGS. 3A and 3C are block diagrams of query execution systems 300 implemented by a computer system 200 in accordance with some implementations. The dashed line 302 indicates a division between computations performed in an offline mode 304 (e.g., before the database engine 120 has received a database query) and computations performed in a real-time processing mode 306 (e.g., after the database engine 120 has received a database query). In the offline mode 304, the database engine 120 samples data (e.g., using the sampling module 244) to select samples 258.2 for one or more data columns, and calculates (246) table domain sizes 254, plots data points on a graph, and computes (247) functions 256 to be used by the cardinality estimation module 242 in the real-time processing mode 306.

Sampling Algorithm

In general, the database engine 120 creates samples of tables in the background so that samples are already selected before queries are received. In some implementations, database rows that are deleted are marked but not physically removed until a garbage collection operation is performed (commit time). The deleted rows can include some rows from the selected samples. At commit time, new samples are constructed if there has been sufficient change to the table. In some implementations, the database engine 120 uses a limit on the number of values for a sample for one or more columns. In some implementations, the database engine 120 has a limit on the number of values (e.g., 20,000 values) for samples for all columns in the table. In this case, larger tables have fewer sampled values per column. In some implementations, the database engine 120 samples at least 100 and up to 1000 values for each column. In some implementations, a sample is drawn from the whole table without replacement for improved statistical confidence. In some implementations, to reduce the costs of random accesses, the database engine 120 draws samples in clusters, trading, via the cluster size, speed of access for the quality of samples. For example, some implementations sample up to 50 clusters that have 512 tuples without replacement. In some implementations, the database engine 120 creates statistically significant samples for tables with more than 1 billion tuples or thousands of columns with only marginal impact on extract sizes. In some implementations, sample creation time accounts for less than 5% of the extract creation time without impacting user experience. In some implementations, the samples created reflect the characteristics of the whole table and not just local patterns in the table. In some implementations, the database engine 120 creates samples that hold up to 5% of the tuples (e.g., at least 1,000 and up 100 million tuples). A lower bound on the number of tuples guarantees exact results for small tables. An upper bound on the tuples allows the database engine to handle large tables (e.g., with more than 20 billion tuples) by storing the sample in a single data block. In some implementations, the database engine 120 uses large samples for domain-size estimations while continuing to persist (e.g., store) small samples (e.g., samples with 1000 rows or less). In some implementations, a persisted sample stores less than 5% of the table rows to stay within file size limits.

In some implementations, the database engine 120 creates a sample that has a fixed size of 5% of the table size from up to 10% of the data blocks. In some implementations, the database engine 120 uses whole data blocks as clusters. In some implementations, the database engine 120 aligns the clusters to the beginning of data blocks for improved sample quality for very large tables. For example, when data in the data blocks is skewed, a fixed number of blocks does not statistically reflect the global distribution.

Because data samples are selected in advance, and one or more processes can modify (e.g., delete rows of) the data samples before the samples are used in real-time processing mode 306, the sampling module 244 also re-computes the samples to obtain updated samples 258.4, which is also input to the domain cardinality estimation module 242, according to some implementations. In some implementations, the database engine 120 creates samples of tables at commit time (e.g., while performing garbage collection), and updates the samples when the table size changes by at least 10%.

Training/Learning Phase (in Offline Mode)

As shown in FIG. 3A, the query execution system 300 calculates (246) table domain sizes and ratio values in the offline mode 304, in accordance with some implementations. The offline computation module 246 performs these calculations for a large variety of tables and sample sizes, according to some implementations. In some implementations, the database engine 120 selects tables and samples that are representative of database queries in the real-time processing mode 306. In some implementations, the database engine 120 selects table sizes that are representative of database queries in the real-time processing mode 306.

According to some implementations, the offline computation module 246 computes domain sizes for the selected tables. Sample domain size ([Sample Domain Size]) is defined as the number of distinct data values that appear at least once in a respective sample for a respective column of a table. The offline computation module 246 also computes [F1], the number of distinct values that appear exactly once in the respective column of the table. Based on [Sample Domain Size] and [F1] values, the offline computation module 246 computes ratios [F1 Ratio] for each of the columns of the selected tables according to the formula:

$$[F1\ \text{Ratio}] := \frac{[F1]}{[\text{Sample Domain Size}]}$$

The offline computation module 246 computes a Guaranteed Error Estimator [GEE] according to the formula:

$$[GEE] := \sqrt{\left(\frac{[\text{Table Size}]}{[\text{Sample Size}]}\right)} * [F1] + [\text{Sample Domain Size}] - [F1]$$

In the equation above, [Table Size] is the size of the table, and [Sample Size] is the size of the data sample, in addition to the quantities [Sample Domain Size] and [F1] that are defined above.

The offline computation module 246 also computes an upper bound [GEE Max] according to the formula:

$$[GEE\ \text{Max}] := [\text{Table Size}]\sqrt{\left(\frac{[F1]}{[\text{Sample Size}]}\right)} + [\text{Sample Domain Size}] - [F1]$$

Based on [GEE] and [GEE Max], the offline computation module 246 computes a patch factor [GEE Patch Factor] for each database column according to the formula:

$$[GEE\ \text{Patch Factor}] = \frac{[\text{Table Domain Size}] - [GEE]}{[GEE\ \text{max}] - [GEE]}$$

The offline computation module 246 subsequently plots a graph of [GEE Patch Factor] for various values of [F1 Ratio], and fits a curve to this plotted data, according to some implementations. The curve defines a function f that computes the [GEE Patch Factor] in terms of [F1 Ratio]. Thus, the offline computation module 246 computes functions f 256 for input to the domain cardinality estimation module 242 in the real-time processing mode 306. In some implementations, a single function f is used for all database columns. In other implementations, a separate function f is computed and used for each distinct database column.

FIG. 3B illustrates an example graph plot of patch factor percentile values 294 versus ratio values 292 for a set of tables and data samples according to some implementations. The marks represent the data points, while the line 290 plots a fitted curve that codifies the correlation between [GEE Patch Factor] and [F1 Ratio]. Although the graph plot shows values for a specific data set, similar plots are obtained for other data sets.

In some implementations, the offline computation module 246 uses different values of $$\left(\frac{[\text{Sample Size}]}{[\text{Table Size}]}\right)$$

to vary the location of the curve bulge 296, thereby arriving at different curve line plots 290 (and hence different functions f256). Some implementations employ adaptive sampling, where smaller extracts get a proportionately larger sample than larger extracts. Some implementations extend adaptive sampling to the sample size into account and to derive the respective curves for the different sample sizes.

Referring back to FIG. 3A, the execution system 300 includes a query parser 232, which receives database queries 226 (e.g., SQL queries). The query parser 232 parses each database query 226 to form a query operator tree 228 and identifies a list of data columns 248 specified in the database query 226. The domain cardinality estimation module 242 processes the list of data columns 248, and estimates domain cardinality 260 for the data columns, according to some implementations.

A query optimizer 236 performs one or more optimization passes to optimize the query operator tree 228, in accordance with the domain cardinality estimates 260, to produce an optimized execution plan 230, according to some implementations. In some implementations, a compiler (e.g., the query compiler 234 described above in reference to FIG. 2A) performs one or more optimization passes as part of an optimizer (e.g., the optimizer 236), and the compiler produces an optimized execution plan (sometimes called a query execution plan or code). As described above in reference to FIG. 2A, an execution module 238 executes the code or optimized execution plan 230 to produce query results 308, according to some implementations.

In some implementations, an intermediate compiler compiles the query operator tree output by the optimization passes to form an intermediate representation, which is subsequently compiled to an optimized execution plan 230. This step typically includes some logical optimization as well. In some implementations, an execution selector is coupled to the intermediate compiler. The execution selector identifies one or more query characteristics and one or more database characteristics to determine how to execute the query. In some implementations, the execution selector selects one of a plurality of execution options to process the intermediate representation. In some implementations, the plurality of execution options includes direct interpretation without compilation, compilation with no or little code optimization (e.g., "cheap" optimizations), and compilation with a more significant level of code optimization.

FIG. 3C is a block diagram illustrating a domain cardinality estimation module 242 in accordance with some implementations. The domain cardinality estimation module 242 includes a module to compute (242.2) a lower bound and an upper bound of distinct data values for a data column 248 identified by the parser (as described above in reference to FIG. 3A). In some implementations, the module 242 also stores the computed bounds in memory 214 (e.g., as bounds of estimates 262). The module 242 also computes (242.4) a patch factor by applying a pre-computed function f to a ratio between the number of distinct values (as computed by the module 242) appearing exactly once in a data sample (e.g., pre-selected data samples 258.2) corresponding to the data column and the number of distinct values in the data sample. In some implementations, the module 242 also stores the computed patch factors in memory 214 as patch factors 264. Based on the computed bounds 262 and patch factors 264, the module 242 computes (242.6) an estimate of distinct data values for the data column. In some implementations, the module 242 also stores the computed estimate in memory 214 as estimates 260.

FIGS. 4A-4I provide a flowchart of a process 400 for optimizing database queries by computing domain cardinality estimates according to some implementations. The process 400 is performed (404) at a database engine 120 having one or more computing devices, each having one or more processors and memory. The memory stores (404) one or more programs configured for execution by the one or more processors. The one or more programs execute (402) to retrieve data from a database (e.g., an SQL database).

Figure 4A:
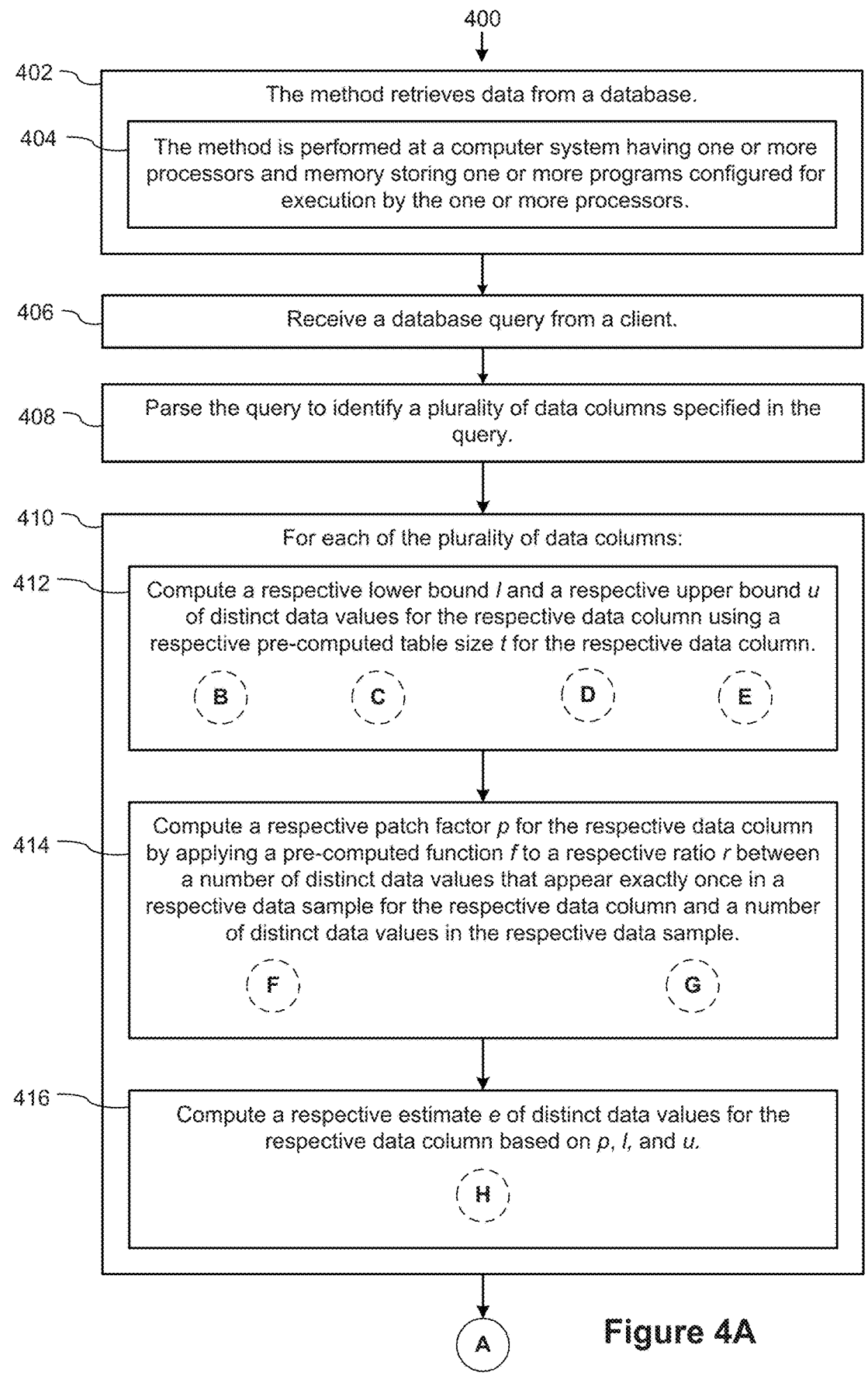
Figure 4B:
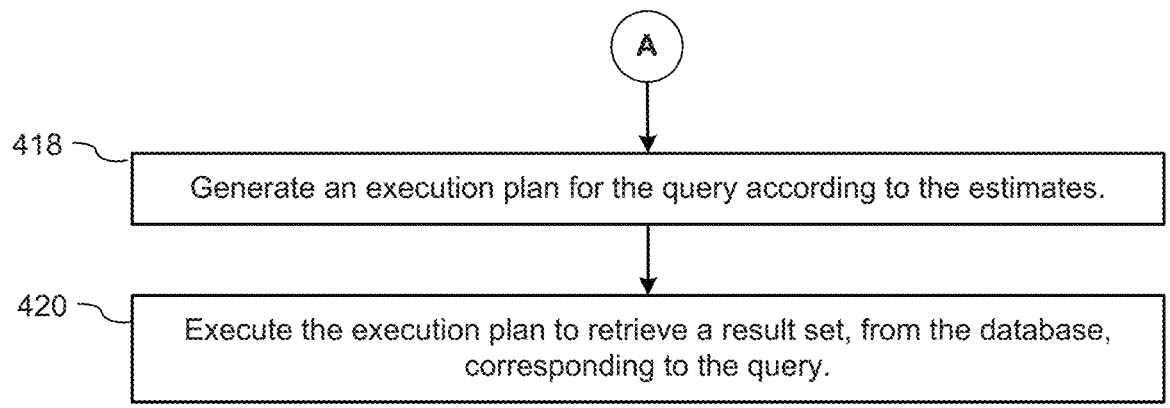

The database engine 120 receives (406) a database query 226 from a client device. The database engine 120 parses (408) the query 226 to identify a plurality of data columns 248 specified in the query. For each (410) of the plurality of data columns, the database engine 120 computes (412) a respective lower bound l and a respective upper bound u of distinct data values 262 using a respective pre-computed table size t 254 for the respective data column. The database engine 120 also computes (414) a respective patch factor p 264 for the respective data column by applying a pre-computed function f 256 to a respective ratio r between a number of distinct data values that appear exactly once in a respective data sample 258 for the respective data column and a number of distinct data values in the respective data sample. Based on the respective patch factor p 264, the respective lower bound l, and the respective upper bound u, the database engine 120 computes (416) a respective estimate e of distinct values (e.g., estimate 260) for the respective data column. Referring next to FIG. 4B, the database engine 120 subsequently generates (418) an execution plan (e.g., execution plan 230) for the query according to the computed estimates 260, and executes (420) the execution plan to retrieve a result set from the database corresponding to the query, and returns the result set to the client.

Figure 4C:
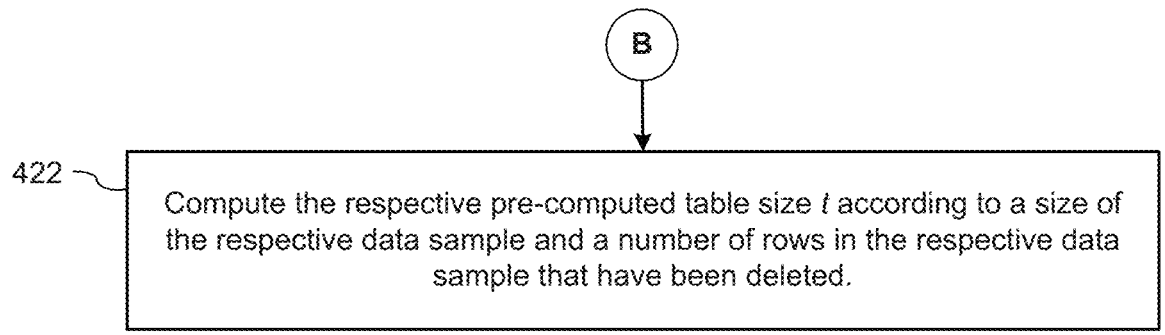
Figure 4D:
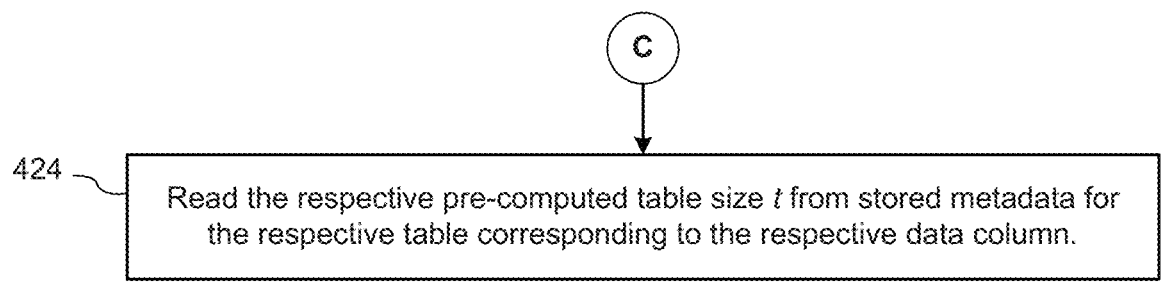

Referring next to FIG. 4C, in some implementations, the database engine 120 computes (422) the respective pre-computed table size t according to a size of the respective data sample and a number of rows in the respective data sample that have been deleted. In some implementations, as shown in FIG. 4D, the process reads (424) the respective pre-computed table size t from stored metadata 252 for the respective table 250 corresponding to the respective data column.

Figure 4G:
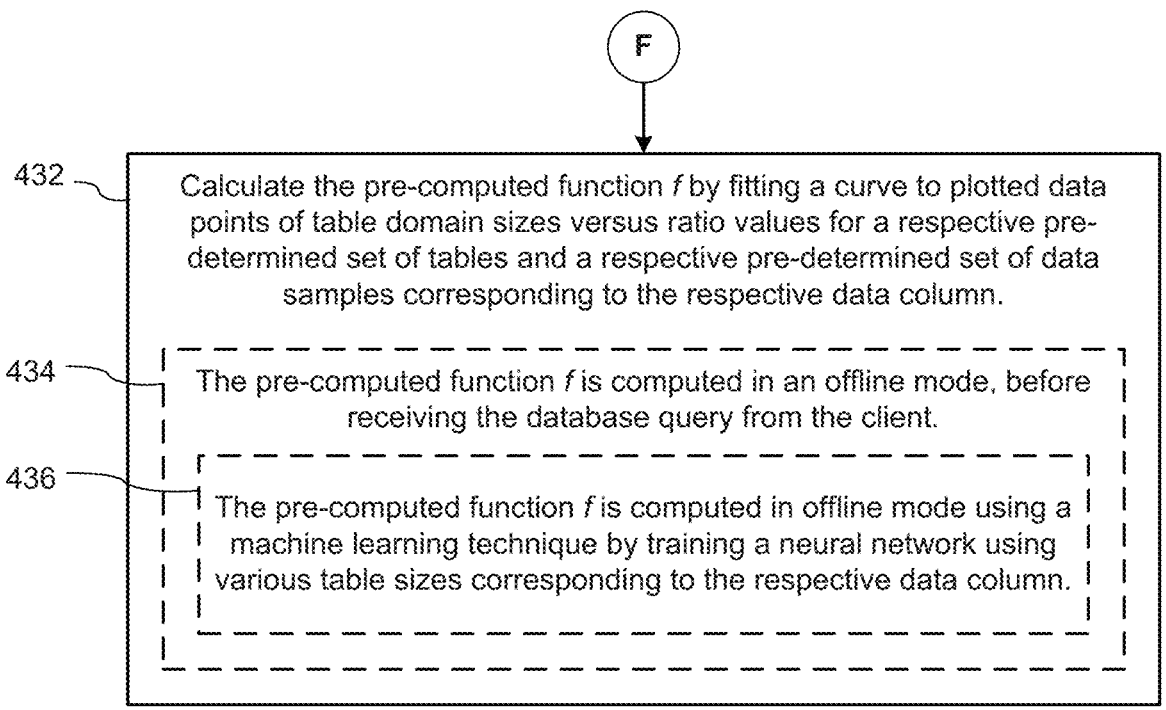
Figure 4H:
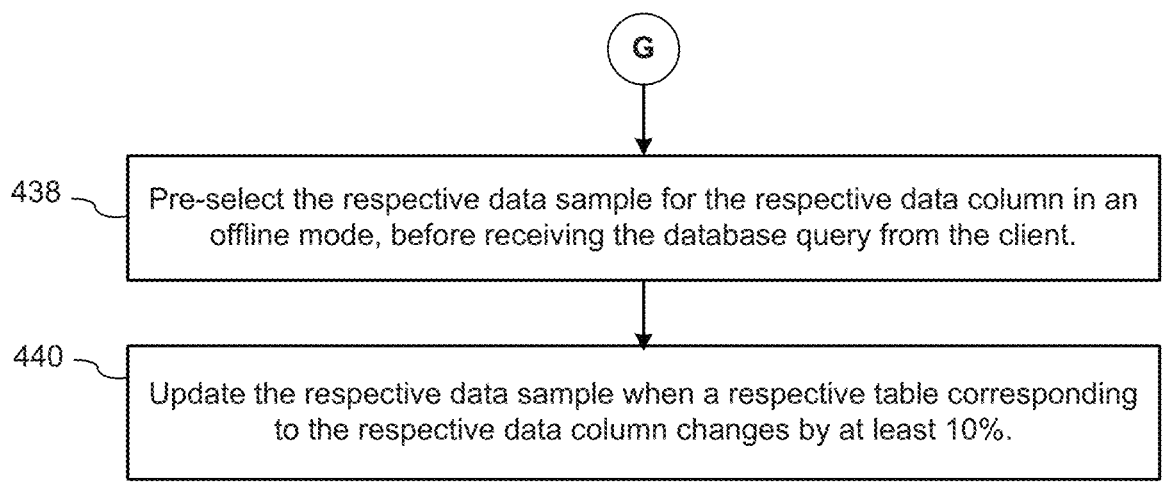

Referring next to FIG. 4H, in some implementations, the database engine 120 pre-selects (438) the respective data sample for the respective data column in an offline mode 304, before receiving a database query from the client. In some instances, the database engine 120 updates (440) the respective data sample when a respective table 250 corresponding to the respective data column changes by at least 10%.

Referring now back to FIG. 4G, in some implementations, the database engine 120 calculates (432) the pre-computed function f 256 by fitting a curve to plotted data points of table domain sizes versus ratio values for a respective pre-determined set of tables 250 and a respective pre-determined set of data samples 258 corresponding to the respective data column. In some implementations, the database engine 120 computes (434) the pre-computed function f in an offline mode 304, before receiving the database query from the client. In some implementations, the process computes (436) the pre-computed function f in the offline mode, using a machine learning technique by training a neural network using various table sizes for tables 250 corresponding to the respective data column.

Referring now back to FIG. 4E, in some implementations, the database engine 120 computes (426) the respective upper bound u and the respective lower bound l of distinct data values (the bound estimates 262) based on the respective pre-computed table size t 254, the number of distinct data values that appear exactly once in the respective data sample, the number of distinct data values in the respective data sample, and the size of the respective data sample (as computed by the database engine 120).

In some implementations, as shown in FIG. 4F, the respective upper bound u and the respective lower bound l of distinct data values correspond (428) to upper and lower bounds of Guaranteed Error Estimator (GEE), respectively.

In some implementations, the lower bound l is defined (430) by the formula:

$$l := \sqrt{\left(\frac{t}{[\text{Sample Size}]}\right)} * [F1] + [\text{Sample Domain Size}] - [F1]. \quad (1)$$

And, the upper bound u is defined by the formula:

$$u := t * \sqrt{\left(\frac{[F1]}{[\text{Sample Size}]}\right)} + [\text{Sample Domain Size}] - [F1]. \quad (2)$$

In equations (1) and (2) above, [Sample Domain Size] is the number of distinct data values in the respective data sample, [F1] is the number of distinct data values that appear exactly once in the respective data sample, t is the respective pre-computed table size for the respective data column, and [Sample Size] is the size of the respective data sample.

Referring next to FIG. 4I, in some implementations, the database engine 120 computes (442) the respective estimate e of distinct data values for the respective data column based on the formula e :=p*u+(1−p)*l, where p is the respective patch factor for the respective data column, l is respective lower bound for the respective data column, and u is respective upper bound for the respective data column.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for retrieving data from a database, comprising:
at a computer system having one or more processors and memory storing one or more programs configured for execution by the one or more processors:
receiving a database query from a client;
parsing the query to identify a plurality of data columns specified in the query;
for each of the plurality of data columns:
computing a respective patch factor p for the respective data column by applying a pre-computed function f to a respective ratio r between a number of distinct data values that appear exactly once in a respective data sample for the respective data column and a number of distinct data values in the respective data sample; and
computing a respective estimate e of distinct data values for the respective data column according to the respective patch factor p;
generating an execution plan for the query according to the estimates;
executing the execution plan to retrieve a result set, from the database, corresponding to the query; and
returning the result set to the client.

2. The method of claim 1, further comprising:
calculating the pre-computed function f by fitting a curve to plotted data points of table domain sizes versus ratio values for a respective pre-determined set of tables and a respective pre-determined set of data samples corresponding to the respective data column.

3. The method of claim 2, wherein the pre-computed function f is computed in an offline mode, before receiving the database query from the client.

4. The method of claim 3, wherein the pre-computed function f is computed in the offline mode using a machine learning technique by training a neural network using various table sizes corresponding to the respective data column.

5. The method of claim 1, further comprising:
computing a respective pre-computed table size t according to a size of the respective data sample and a number of rows in the respective data sample that have been deleted.

6. The method of claim 1, further comprising:
pre-selecting the respective data sample for the respective data column in an offline mode, before receiving the database query from the client.

7. The method of claim 1, further comprising:
updating the respective data sample when a respective table corresponding to the respective data column changes by at least 10%.

8. The method of claim 1, wherein computing the respective estimate e of distinct data values for the respective data column comprises calculating e based on the following formula:

$$e := p*u+(1-p)*l$$

wherein:
p is the respective patch factor for the respective data column;
l is a respective lower bound of distinct data values for the respective data column; and
u is a respective upper bound of distinct data values for the respective data column.

9. A system for retrieving data from a database, comprising:
a display;
one or more processors;
memory; and
one or more programs stored in the memory and configured for execution by the one or more processors, the one or more programs comprising instructions for:
receiving a database query from a client;
parsing the query to identify a plurality of data columns specified in the query;
for each of the plurality of data columns:
computing a respective patch factor p for the respective data column by applying a pre-computed function f to a respective ratio r between a number of distinct data values that appear exactly once in a respective data sample for the respective data column and a number of distinct data values in the respective data sample; and
computing a respective estimate e of distinct data values for the respective data column according to the respective patch factor p;
generating an execution plan for the query according to the estimates;
executing the execution plan to retrieve a result set, from the database, corresponding to the query; and
returning the result set to the client.

10. The system of claim 9, wherein the one or more programs further comprise instructions for:
  calculating the pre-computed function f by fitting a curve to plotted data points of table domain sizes versus ratio values for a respective pre-determined set of tables and a respective pre-determined set of data samples corresponding to the respective data column.

11. The system of claim 10, wherein the pre-computed function f is computed in an offline mode, before receiving the database query from the client.

12. The system of claim 11, wherein the pre-computed function f is computed in the offline mode using a machine learning technique by training a neural network using various table sizes corresponding to the respective data column.

13. The system of claim 9, wherein the one or more programs further comprise instructions for:
  computing a respective pre-computed table size t according to a size of the respective data sample and a number of rows in the respective data sample that have been deleted.

14. The system of claim 9, wherein the one or more programs further comprise instructions for:
  pre-selecting the respective data sample for the respective data column in an offline mode, before receiving the database query from the client.

15. The system of claim 9, wherein computing the respective estimate e of distinct data values for the respective data column comprises calculating e based on the following formula:

$$e := p*u + (1-p)*l$$

wherein:
  p is the respective patch factor for the respective data column;
  l is a respective lower bound of distinct data values for the respective data column; and
  u is a respective upper bound of distinct data values for the respective data column.

16. A non-transitory computer readable storage medium storing one or more programs configured for execution by a computer system having a display, one or more processors and memory, the one or more programs comprising instructions for:
  receiving a database query from a client;
  parsing the query to identify a plurality of data columns specified in the query;
  for each of the plurality of data columns:
    computing a respective patch factor p for the respective data column by applying a pre-computed function f to a respective ratio r between a number of distinct data values that appear exactly once in a respective data sample for the respective data column and a number of distinct data values in the respective data sample; and
    computing a respective estimate e of distinct data values for the respective data column according to the respective patch factor p;
  generating an execution plan for the query according to the estimates;
  executing the execution plan to retrieve a result set, from the database, corresponding to the query; and
  returning the result set to the client.

17. The computer readable storage medium of claim 16, wherein the one or more programs further comprise instructions for:
  calculating the pre-computed function f by fitting a curve to plotted data points of table domain sizes versus ratio values for a respective pre-determined set of tables and a respective pre-determined set of data samples corresponding to the respective data column.

18. The computer readable storage medium of claim 17, wherein the pre-computed function f is computed in an offline mode, before receiving the database query from the client.

19. The computer readable storage medium of claim 18, wherein the pre-computed function f is computed in the offline mode using a machine learning technique by training a neural network using various table sizes corresponding to the respective data column.

20. The computer readable storage medium of claim 16, wherein computing the respective estimate e of distinct data values for the respective data column comprises calculating e based on the following formula:

$$e := p*u + (1-p)*l$$

wherein:
  p is the respective patch factor for the respective data column;
  l is a respective lower bound of distinct data values for the respective data column; and
  u is a respective upper bound of distinct data values for the respective data column.

* * * * *